US006742334B2

(12) United States Patent
Fan

(10) Patent No.: US 6,742,334 B2
(45) Date of Patent: Jun. 1, 2004

(54) SPEED REGULATION JACK AND METHOD OF OPERATION

(76) Inventor: Qun Fan, No. 15, Qiaolian Lane, Nongfengliqun Road, Gaomi, Shandong (CN)

( * ) Notice: Subject to any disclaimer, the term of this patent is extended or adjusted under 35 U.S.C. 154(b) by 0 days.

(21) Appl. No.: 10/277,447

(22) Filed: Oct. 22, 2002

(65) Prior Publication Data

US 2004/0040296 A1 Mar. 4, 2004

(30) Foreign Application Priority Data

Aug. 29, 2002 (CN) ....................................... 02253809 U

(51) Int. Cl.[7] ................................................ F16D 31/02
(52) U.S. Cl. .............................. 60/479; 60/481; 60/482
(58) Field of Search .......................... 60/477, 479, 481, 60/482; 92/85 R, 181 R

(56) References Cited

U.S. PATENT DOCUMENTS 5,755,099 A 5/1998 Hung .......................... 60/479
6,199,379 B1 * 3/2001 Hung .......................... 60/479
6,247,307 B1 * 6/2001 Hung .......................... 60/479

FOREIGN PATENT DOCUMENTS

JP 99209440.2 2/2000 ............. B66F/3/24

* cited by examiner

*Primary Examiner*—Thomas E. Lazo
(74) *Attorney, Agent, or Firm*—Houston Eliseeva LLP

(57) ABSTRACT

A speed regulation jack comprises at least one input cylinder and one output cylinder, and parallel hydraulic lines between the input and output cylinders. A differential oil circuit is connected between the inlet cavity and the return cavity of the output cylinder, and a control valve is connected in series between the return cavity of the output cylinder and the oil tank, and this control valve controls the return oil of the return cavity. This speed regulation jack takes the magnitude of the load as its signal and transfers automatically between different lifting speeds, thus enhancing the lifting efficiency of the jack.

16 Claims, 13 Drawing Sheets

SPEED REGULATION JACK AND METHOD OF OPERATION

BACKGROUND OF THE INVENTION

A jack is one of the commonly used tools in our daily life. It is used to reduce the force required to lift a load over a preset lift distance. Its operational principle is to force the input piston, having a smaller sectional area, to move with a smaller force. The movement of the smaller piston pushes the hydraulic oil into the output cylinder, thus driving the output piston, which has a larger sectional area to lift the load. In accordance with the Law of Conservation of Energy, the input piston travels a much larger distance than the output piston does. Thus, it is typically necessary to push the input piston repeatedly to lift the load to a certain distance. In this process, each pumping cycle against the input piston results in the same lift distance of the output piston. This is independent of the magnitude of the load. As a result, in any case of an idle load (i.e., no load), a light load, or a heavy load, it necessary to pump the jack repeatedly, with the load going up very slowly. This wastes both time and effort.

To solve this problem, hydraulic jacks have been proposed in which a blind hole is formed in the middle of the piston of the output cylinder. An oil pipe is inserted into this blind jack hole. In the case of an idle load, when the piston of the input cylinder is pumped or pressed, the hydraulic oil flows into the blind hole via the oil pipe, and pushes against the end face of the blind hole. This moves the piston up at a fast speed. In the case of a heavier load, part of the hydraulic oil goes up and opens a sequential valve leading into the output cylinder. The oil thus applies forces against the larger ring-type thrust surface of the piston, and lifts the load slowly together with the hydraulic oil that flows into the blind hole and applies forces against the end face of the blind hole. Since the blind hole has a smaller area to receive force, the lifting speed of the jack is very fast in the case of an idle load. Generally, the piston of the output cylinder reaches the weight after being pumped one or two times. On the other hand, in the case of a heavy load, since the whole sectional area of the piston of the output cylinder is taken as the thrust surface, the purpose of saving effort is also achieved, enabling the heavy load to be lifted with a low force.

However, it is found from practical application this type of hydraulic jack cannot meet the requirements as expected above. The reason is that when the hydraulic oil is pressed into the output cylinder via the oil pipe, the piston of the output cylinder goes up rapidly; the pressure in the ring-type cavity of the output cylinder goes down swiftly to suck hydraulic oil from the oil tank. However, since the piston moves relatively fast and the area of the ring-type cavity changes very quickly, the sucked hydraulic oil cannot fully fill up the ring type cavity, resulting in a phenomenon of inefficient oil suction. Since there exists some air in the ring-type cavity of the output cylinder, when the output cylinder starts to lift load, the load applies forces to the piston and makes the piston fall back a certain distance, thus reducing the speed of the load lift. Moreover, after many, repeated pumping cycles, the air held in the ring type cavity of the output cylinder flows into the input cylinder via the oil circuit, bringing about the same phenomenon of inefficient oil suction for the input cylinder. This reduces the lift distance of each pump press, and additionally, the lifting efficiency. In addition, this type of jack has also another disadvantage. Since the lifting force comes from the hydraulic oil flowing into the blind hole via the oil pipe and into the ring type cavity of the output cylinder via the one-way valve, the area of the blind hole and that of the ring type cavity changes with each pump. It is necessary to ensure a balance between the pressures from the hydraulic oil flowing into the ring type cavity and that flowing into the blind hole to achieve a steady movement of the output piston. Unfortunately, it is very difficult to accomplish such a result in a practical mass production process. As a result, when the controlled hydraulic oil enters the ring-type cavity and is locked, crack of the thin-wall oil pipe happens often due to excessively high pressure in the blind hole. This results in low yield of finished products for this type of jack and thus increases its production cost.

SUMMARY OF THE INVENTION

It is an object of the present invention to provide a speed regulation jack, which takes the size of the load as signal and automatically transfers between different lift speed levels, so that the lifting efficiency of the jack is increased.

It is also an object of the present invention to provide a speed regulation jack in which a limit unloading mechanism is set to prevent the piston rod from striking the cylinder top cover and possibly cracking it, so that the lifting efficiency of the jack is enhanced.

The invention concerns a speed regulation jack, which comprises at least one input cylinder and one output cylinder, and hydraulic lines connected in parallel between the input and output cylinders. A differential oil circuit is connected between the inlet cavity and the return cavity of the output cylinder, and a control valve is connected in series between the return cavity of the output cylinder and the oil tank. This control valve controls the return oil of the return cavity.

A one-way valve is set in the differential oil circuit, and the return cavity of the output cylinder is unidirectionally connected to inlet cavity via this one-way valve.

A limiting or unloading mechanism is set at the front-end of the return cavity of the output cylinder.

A return groove can be set on the mating surface between the front-end of the return cavity and the piston of the output cylinder. The return cavity is unidirectionally connected to the oil tank via a one-way valve. The core of the one-way valve is fixed to a pressure pin out of the bush of the one-way valve. One end of the pressure pin is seated in the return cavity to control the opening and closure of the one-way valve, to thereby create a limit unloading mechanism. In the case of idle operation, when the piston reaches its maximum distance, it reaches the pressure pin and opens the limit unloading mechanism—the hydraulic oil in the inlet cavity of the output cylinder returns into the oil tank via the return groove and sequential valve. This can be used to meet the requirements of inspection and test standard in the case of from idle operation to maximum oil return.

The one-way valve with a pressure pin of the limit unloading mechanism can share the same valve core with the control valve to form a composite control valve.

The control valve can be a sequential valve.

The hydraulic line can be a hydraulic speed regulation line.

Speed regulation cylinders can be set in the hydraulic speed regulation lines.

The hydraulic speed regulation lines comprise at least two hydraulic sub-lines connected in parallel. These hydraulic speed regulation lines take the load pressure of the output cylinder as its control signal to control the opening and closure of its hydraulic sub-lines or their combination at different speed levels.

Control valves are set in the hydraulic sub-lines that take the load pressure as their control signal to control the opening and closure of the hydraulic sub-lines.

The opening pressure of the control valves in the hydraulic sub-lines is set in sequence and opens in sequence with the increase of load.

Speed regulation cylinders can be set in the hydraulic sub-lines and the difference between the piston areas of the input and output cavities in the hydraulic sub-lines are set in sequence.

The hydraulic sub-line at the lowest speed level in the hydraulic speed regulation line can be directly connected to the input and output cylinders via a control valve.

A flexible restoring mechanism is set in the speed regulation cylinder, and the output cavity of the speed regulation cylinder is connected to the oil tank via a one-way valve.

The speed regulation cylinder can comprise oil cylinders of two different levels, the sectional area of the first-level cylinder is less than that of the second-level cylinder, and the first-level piston and the second-level one are interconnected via a piston rod. Additionally, the speed regulation cylinder can also be made up of a single-level oil cylinder and its piston rod extends out of the input cavity.

The input cylinder, output cylinder and hydraulic speed regulation line can be set in one valve bush combination, and the output cylinder jacket is set in the oil tank.

The following illustrates the speed regulation operating method of the present invention in a mode where the hydraulic speed regulation line is made up of two hydraulic sub-lines. In the case of an idle load, when the piston of the input cylinder is pressed, the hydraulic oil is pumped to the input cavity of the speed regulation cylinder in the hydraulic sub-lines at a high speed level to push its piston to press the hydraulic oil in the output cylinder, and with the opening of the control valve, the hydraulic oil flows into the output cylinder and then pushes the piston of the output cylinder to move forward. Since in such a case the pressure in the return cavity of the output cylinder is not high enough to open the sequential valve connected to the oil tank, the sequential valve remains in its closed state. Thus, the hydraulic oil in the return cavity of the output cylinder flows into the inlet cavity of the output cylinder via the one-way valve to form a differential oil circuit that increases the lifting speed once again. In this case, the piston rod of the output cylinder lifts load at the first speed V1. When the piston in this input cylinder is raised, the piston in the speed regulation cylinder returns to its original position under the forces from the flexible restoring mechanism, and meanwhile, the output cavity connected to the oil tank sucks oil and fills up the output cavity. When the piston in the input cylinder is pressed once again, the above process repeats. In this process, since the sectional area of the piston in the input cavity of the speed regulation cylinder is smaller than that of the piston in the output cylinder, the lift distance to lift the load each time is increased via the differential oil circuit of the output cylinder, the lifting speed is enhanced. The lifting speed V1 is the fastest one.

With the gradual increase of load of the hydraulic jack, the pressure of the output cylinder is gradually increased. The pressure of the input cylinder is still not high enough to open the sequential valve in the low-speed hydraulic speed regulation sub-line. However, the pressure of the return cavity of the output cylinder becomes higher, opening the control valve connected to the oil tank. The hydraulic oil in the return cavity directly flows back into the return tank via this control valve. In such a case, the pressure of the inlet cavity of the output cylinder is higher than that of the return cavity and the one-way valve in the differential oil circuit is closed. With the differential oil circuit blocked, the piston rod of the output cylinder lifts load at the speed V2. Since in this case, there is no further speed regulation via the differential oil circuit, the speed V2 is less than the speed V1 (V2<V1). However, the capacity to lift load in this case is enhanced, being capable enough to lift the load.

With the further increase in the load of the hydraulic jack, the pressure of the output cylinder also increases further. The jack enters a heavy load state. In such a heavy load state, the pressure of the hydraulic oil produced from the output cylinder is higher than the set pressure of the sequential valve in the low-speed hydraulic sub-line, and thus the sequential valve opens. Part of the hydraulic oil in the input cylinder flows into the inlet cavity of the output cylinder via this sequential valve, and as a result, the piston rod of the output cylinder moves at the speed V3 to lift the load. Since there is no speed regulation cylinder set in the low-speed regulation sub-line, the speed V3 is less than the speed V2 (V3<V2). However, in accordance with the Law of Conservation of Energy, the capacity to lift the load increases under the same pressure, being capable enough to lift the load.

In the above operating process, the transfer between various lifting speeds is automatically done with the change of the load, and does not require any additional operation or control. The present invention not only enhances the lifting efficiency, but also features simple and easy operation, achieving the purpose of both time and effort savings. Besides, in the speed regulation process, except that the input cylinder absorbs oil as does a conventional jack when the low-speed hydraulic sub-line between the input cylinder and output cylinder of hydraulic sub-line opens, there is no oil added into the input cylinder at all the other speed levels. It only takes the hydraulic oil as a medium of pressure transfer to transfer the pressure applied against the piston of the input cylinder. As a result, it does not involve the problem of inadequate absorption of oil in the input cylinder, as is the case with the existing technology. Furthermore, the absorption process of oil after the input cylinder directly pumps hydraulic oil into the output cylinder via the low-speed hydraulic sub-line does not involve the problem of inadequate absorption of oil. All of the above works to avoid the phenomenon of falling back during lifting and thus ensures the work efficiency of lifting load.

Besides, in the present utility model, since there is a limit unloading mechanism set at the front-end of the oil return cavity, when the piston of the output cylinder reaches its maximum distance, the limit unloading mechanism opens and starts to relieve load, thus avoiding the phenomenon that the piston strikes the end cover of the cylinder when the jack reaches its maximum lifting position. Furthermore, since the limit unloading mechanism is formed by the return groove on the mating surface between the front-end of the return cavity in the output cylinder and the piston and the one-way valve with a pressure pin, when the piston in the output cylinder reaches the front-end of the return cavity, the inlet cavity of the output cylinder is connected to the return cavity via the return groove. Meanwhile, the piston holds against the pressure pin fixed to the valve core and opens the one-way valve. The hydraulic oil in the inlet cavity flows into the return cavity via the return groove, and then into the return tank via the one-way valve. In such a case, no matter how the operator applies force to press the piston rod of the input cylinder, the piston of the output cylinder remains static without any lifting operations since the pressure of the inlet cavity and that of the return cavity are balanced. As a result, this avoids the phenomenon that the piston strikes and possibly cracks the end cover of the cylinder. Additionally, since the hydraulic oil of the inlet cavity of the output cylinder can flow back into the return tank via the return groove in the first place and then via the one-way valve connected to the oil tank, then the inlet cavity does not involve the phenomenon of overload relief. As a result, the load, which has been lifted to a position, will be kept there without falling down as a result of the unloading.

In the jack in the present invention, three or more hydraulic speed regulation sub-lines can be connected in parallel. With one hydraulic sub-line added, two speed levels are accordingly added. This makes the jack's speed adjustable between multi-levels during its operation. In terms of its design, different specifications of the jack can be worked out according the magnitude of the load so that in application, different jacks of different specifications can be selected depending on the specific requirements. When it is used to lift relatively smaller load, a jack with relatively fewer speed levels can be selected. On the other hand, when it is used to lift a relatively larger load, a jack with relatively more speed levels can be selected. Since the jack of the present invention exhibits different lifting capacities when it is working at different speed levels, it is, in fact, equivalent to a conventional jack with a corresponding lifting capacity. The effect when it is working at different speed levels in parallel is equivalent to several jacks of different specifications working at different load ranges with the increase of the load when it is used to lift load. As a result, the present invention incorporates functions of several conventional jacks of different specifications into one jack, and automatically regulates its speed in correspondence with the load changes. It is simple and convenient in lifting operations with enhanced lifting efficiency and equipment utilization rate.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

First Embodiment Configurations

Figure 1:
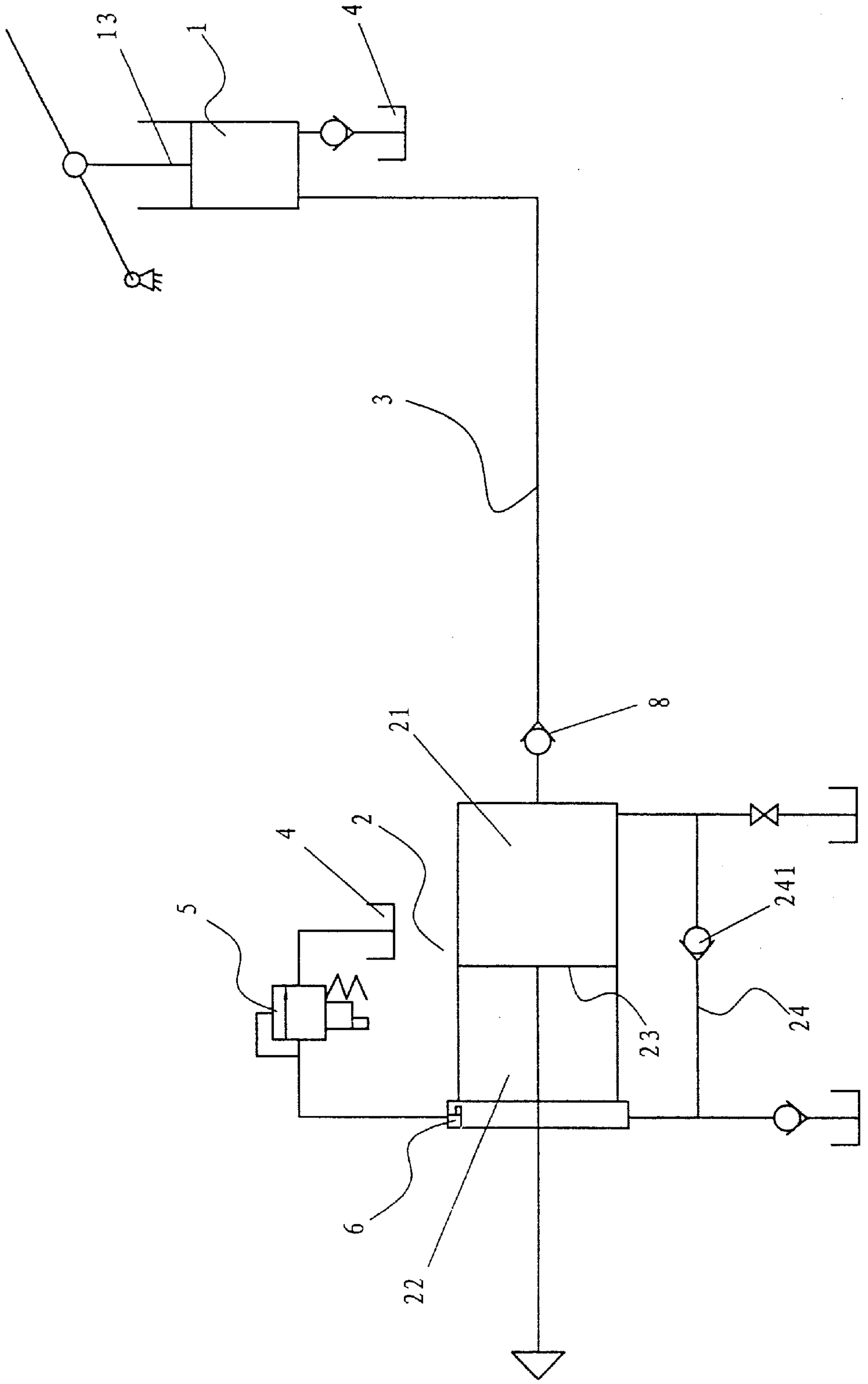
FIG. 1 is a hydraulic line diagram of a first embodiment of the speed regulation jack of the present invention.
Figure 2:
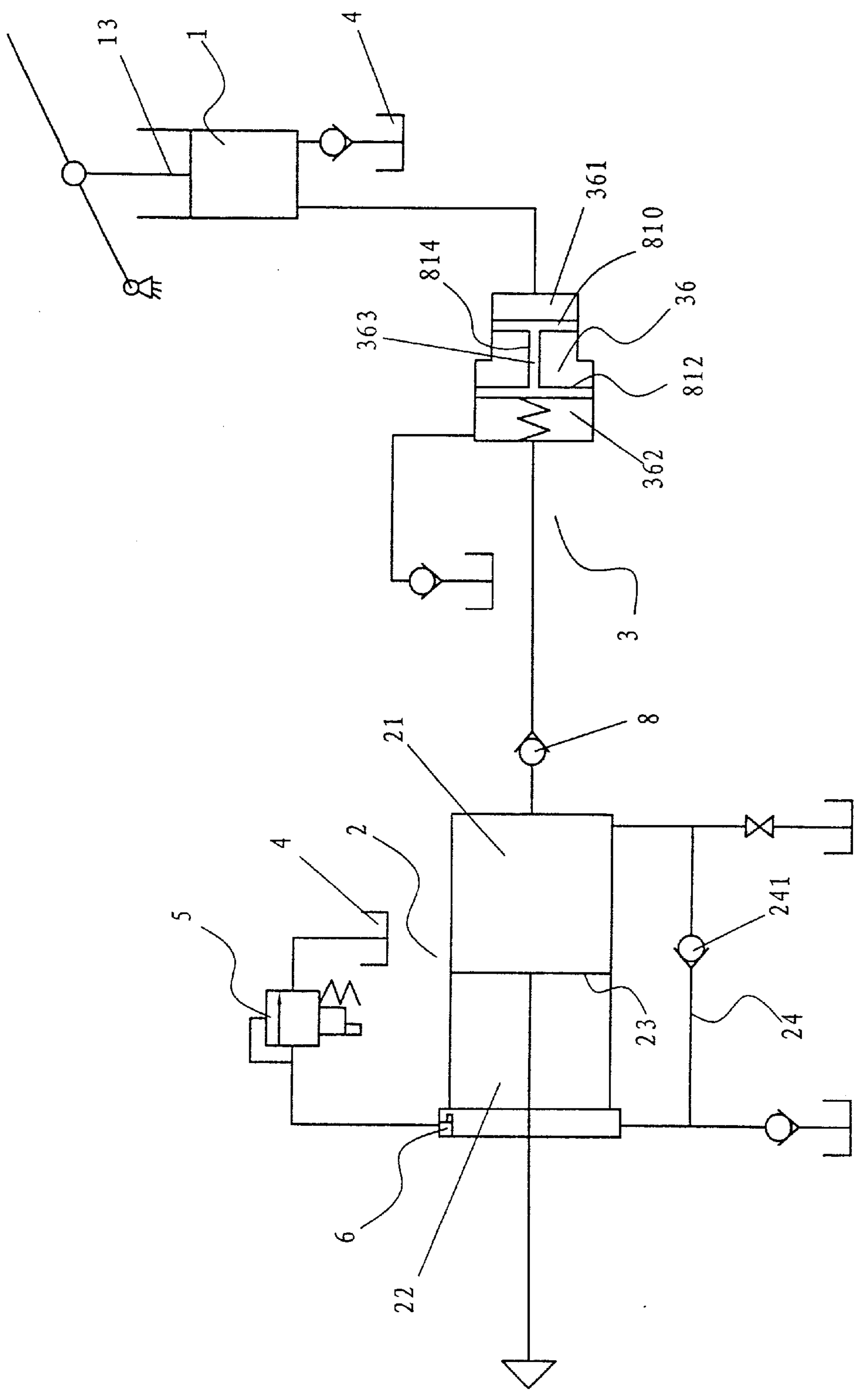
FIG. 2 is a hydraulic line diagram of another configuration of the first embodiment of the inventive speed regulation jack.

As shown in FIGS. 1 and 2, the inventive speed regulation jack comprises at least one input cylinder 1 and one output cylinder 2, and one hydraulic line 3 connected between the input cylinder 1 and output cylinder 2.

A differential oil circuit 24 is connected between the inlet cavity 21 and the return cavity 22 of the output cylinder 2, and a control valve 5 is connected in series between the return cavity 22 of the output cylinder 2 and the oil tank 4. This control valve 5 controls the return oil of the return cavity 22. When the pressure in the return cavity 22 is less than the opening pressure of the control valve 5, the control valve 5 closes, and the hydraulic oil in the return cavity 22 of the output cylinder 2 flows into the inlet cavity 21 via this differential hydraulic oil circuit 24. Thus the pressure of the hydraulic oil in the inlet cavity 21 increases and therefore enhances the speed of the piston 23, which pushes the output cylinder 2. On the other hand, however, when the pressure of the hydraulic oil in the return cavity 22 is higher than the opening pressure of the control valve 5, the control valve 5 opens, and the hydraulic oil in the return cavity 22 flows directly into the oil tank 4 via the control valve 5.

As shown in FIGS. 1 and 2, the control valve 5 can be a sequential valve.

Furthermore, a one-way valve 241 is set in the differential oil circuit 24 and the return cavity 22 of the output cylinder 2 is unidirectionally connected to inlet cavity 21 via this one-way valve 241. When the pressure in the inlet cavity 21 is less than that of the return cavity 22, the hydraulic oil in the return cavity 22 goes up and opens the one-way valve 241 and flows into the inlet cavity 21, thus forming a differential oil circuit. As a result, the speed of the piston 23 is increased. On the other hand, when the pressure in the return cavity 22 is larger than the opening pressure of the control valve 5, the control valve 5 opens, and the hydraulic oil in the return cavity 22 flows directly into the oil tank 4 via the control valve 5. In such a case, the pressure in the return cavity 22 decreases, and the pressure in the inlet cavity 21 is less than that of the return cavity 22, thus producing a backpressure against the one-way valve, thereby closing the differential oil circuit. As a result, the capacity to lift load of the piston 23 is enhanced.

As shown in FIG. 1, the hydraulic line can be an oil circuit that directly connects input cylinder 1 to the output cylinder 2.

In the case of an idle or light load, when the operator presses the piston 13 of the input cylinder 1, the hydraulic oil is delivered directly to the inlet cavity 21 of the output cylinder 2 via the hydraulic line 3 to push the piston 23 to move. The hydraulic oil in the return cavity 22 is pressurized and opens the one-way valve 241, and then returns to the inlet cavity 21 via the differential oil circuit 24, forming differential operation. Thus, the speed of the piston 23 is increased thereby reaching the load more quickly and beginning the lift of the load. With the gradual increase of the load, the pressure in the inlet cavity 21 becomes higher. This creates backpressure against the one-way valve, closing the differential oil circuit. The hydraulic oil in the return cavity 22 goes up and opens the sequential valve 5, and flows directly into the return tank via the sequential valve 5. In such a case, the lifting speed of the piston 23 decreases, but its lifting capacity is increased, being capable enough to lift the load. In this case, the jack works similarly as a conventional jack does, which can lift larger load with only a smaller force.

In the process of operation above, since the differential action of the differential oil circuit 24 is used, the lifting speed of the piston 23 is enhanced and its working time shortened. On the other hand, however, in the case of a heavy load, the differential oil circuit 24 closes, the jack works as a conventional jack to handle the larger load with a smaller force or effort, achieving the purpose of both saving time and effort. Additionally, the above operation process is done automatically without any additional operations, so it is convenient in operation.

Figure 3:
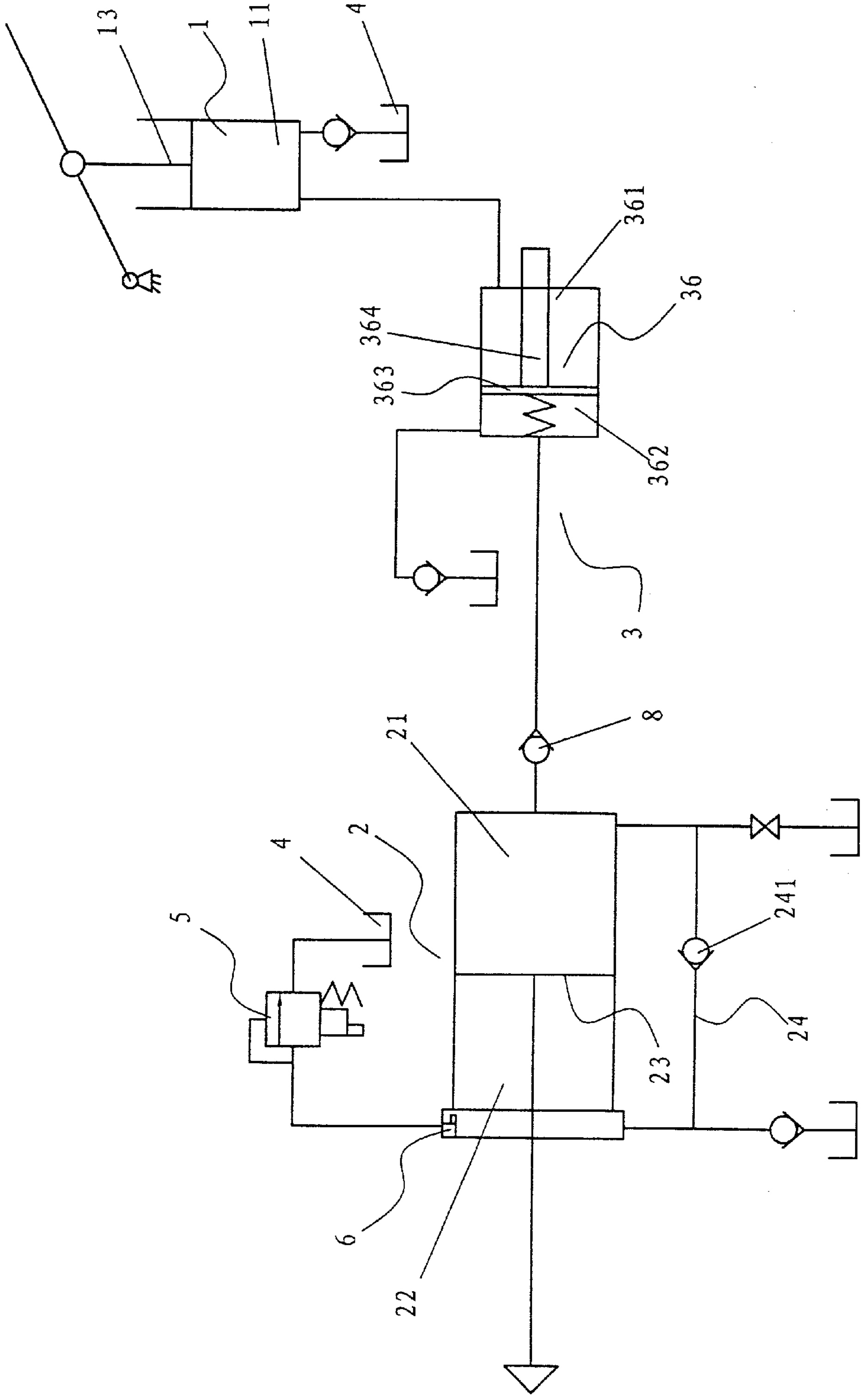
FIG. 3 is a hydraulic line diagram of still another configuration of the first embodiment of the inventive speed regulation jack.

As shown in FIG. 3, hydraulic line 3 can be a hydraulic speed regulation line to further enhance the speed of the piston 23. Speed regulation cylinder 36 is set in the hydraulic speed regulation line 3, and the area of the thrust surface of the output cavity 362 of the speed regulation cylinder 36 is made larger than that of the thrust surface of the input cavity 361. Thus, when the hydraulic oil entering the input cavity 361 pushes the piston 363 to move, it will push the hydraulic oil of larger volume in the output cavity 362 to enter into the inlet cavity 21 of the output cylinder 2. As a result, the speed of the piston 23 is enhanced and the lifting speed of the jack, and moreover its lifting efficiency are further enhanced in the case of an idle or light load.

As shown in FIGS. 1 and 2, in terms of the hydraulic line 3, the hydraulic oil can be delivered to the inlet cavity 21 of the output cylinder via a one-way valve 8, so that back pressure is produced in the case of a larger load to close this one-way valve 8 to prevent the load from falling down in case of a falling back of the piston 23 of the output cylinder 2.

The speed regulation cylinder 36 can be made up of cylinders of two levels as shown in FIG. 2. The sectional area of the piston of the first-level cylinder 810 is less than that of the piston 812 of the second-level cylinder, and the first-level piston 810 is connected to the second-level piston 812 via a piston rod 814.

As shown in FIG. 3, the speed regulation cylinder 36 can be made up of a single-level oil cylinder and its piston rod 364 extends out of the input cavity 361. As a result, the thrust area of the piston in the input cavity 361 is the ring-type area excluding the area of the piston rod 364, and on the other hand, the thrust area of the piston of the output cavity 362 is the complete sectional area of its piston, thus larger than the thrust area of piston of the input cavity 361, achieving the speed regulation function.

Figure 7:
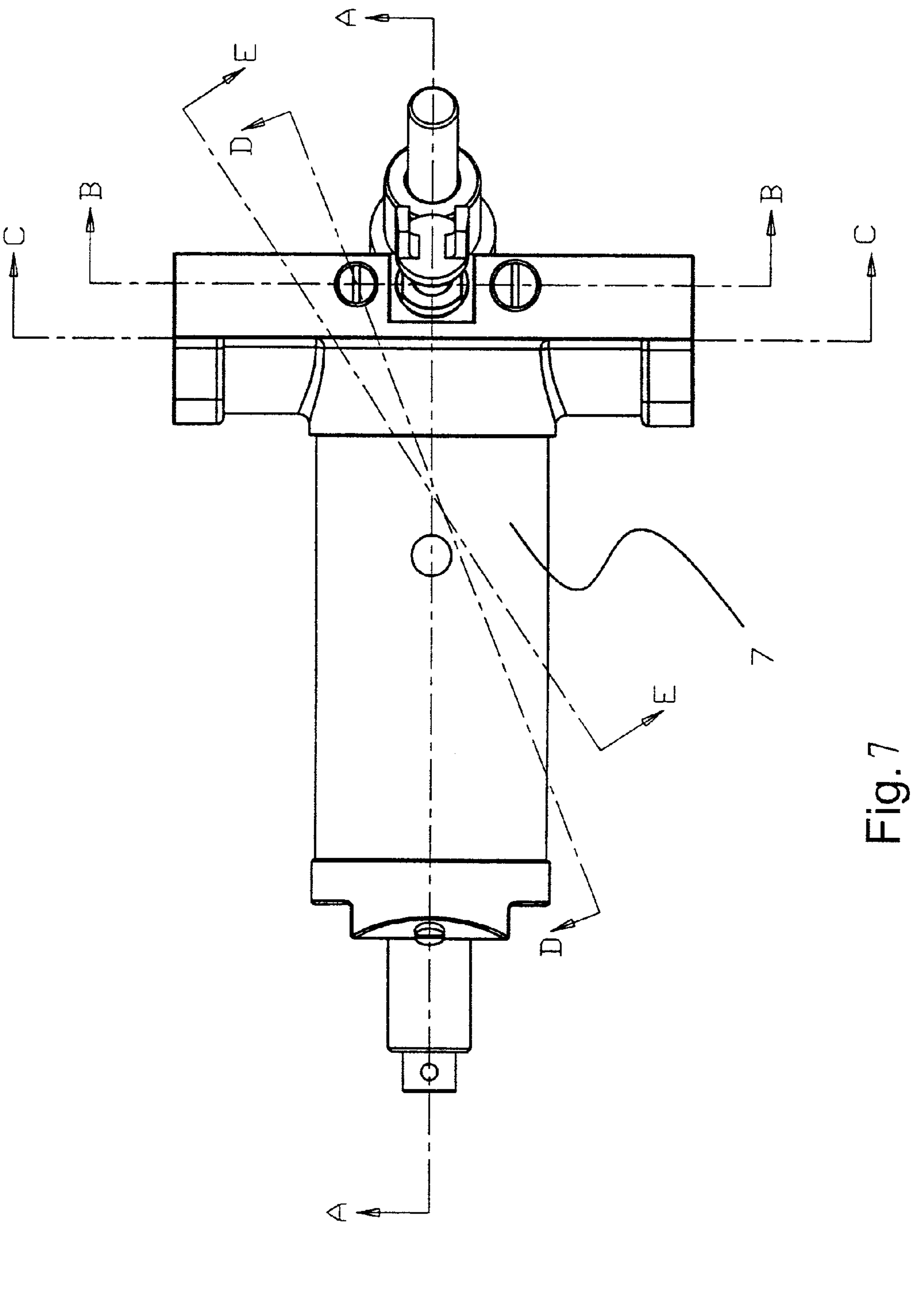
FIG. 7 is a plan view of a valve bush combination of the inventive jack.
Figure 7A:
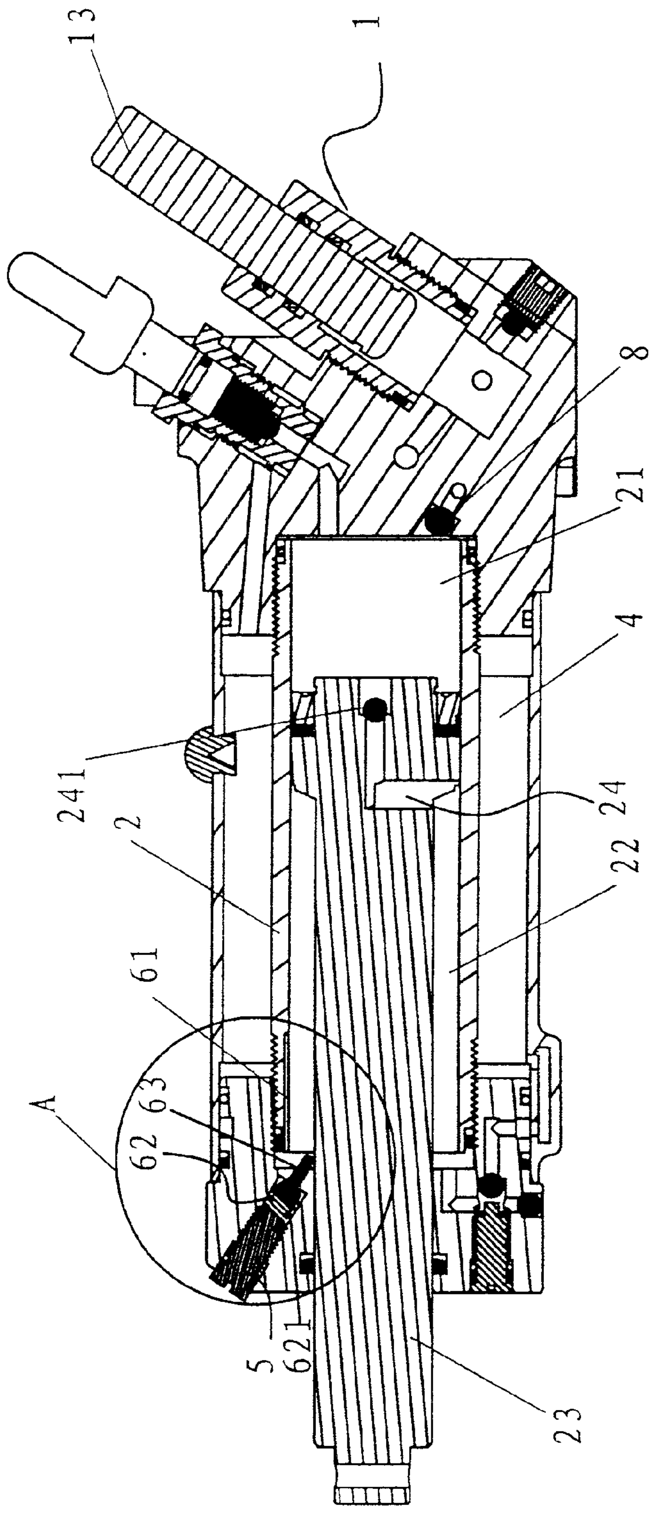
FIG. 7A is a A—A cutaway view of FIG. 7.
Figure 7B:
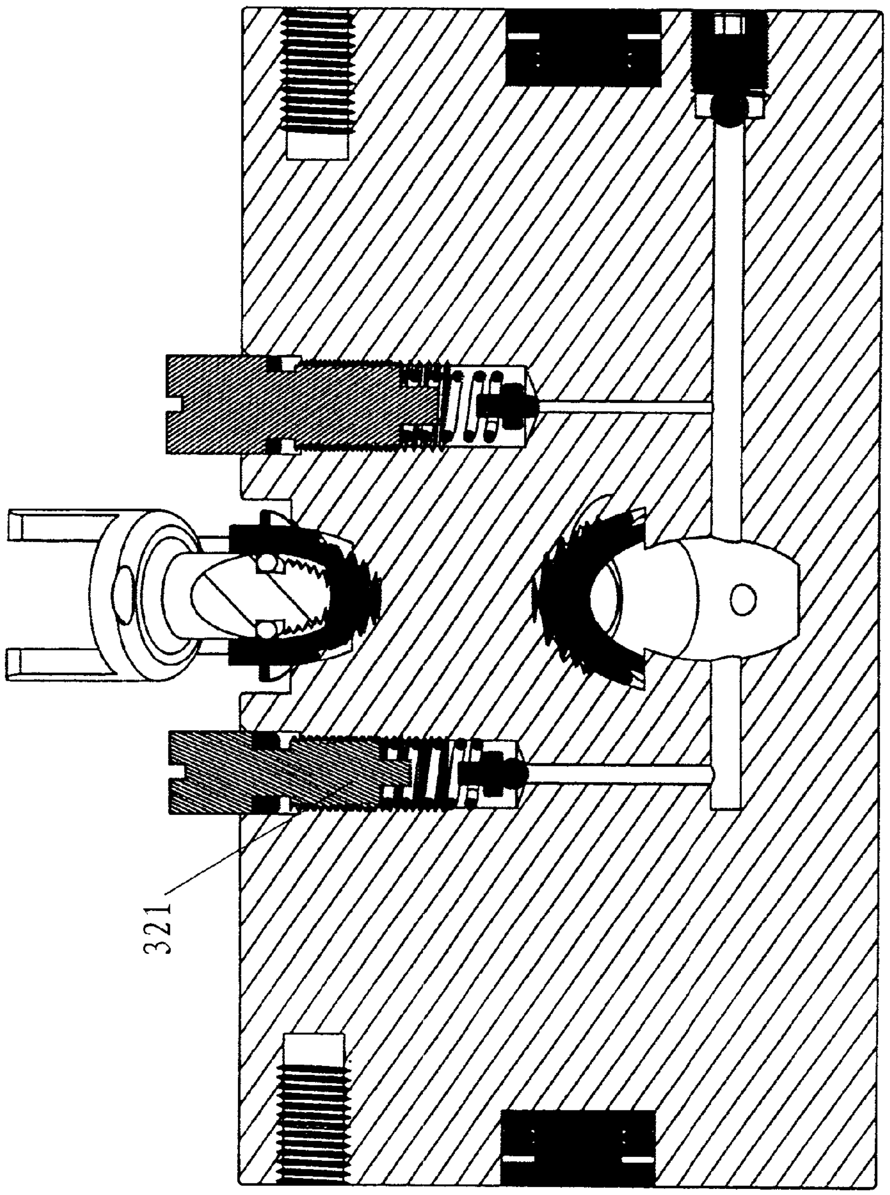
FIG. 7B is a B—B cutaway view of FIG. 7.
Figure 7C:
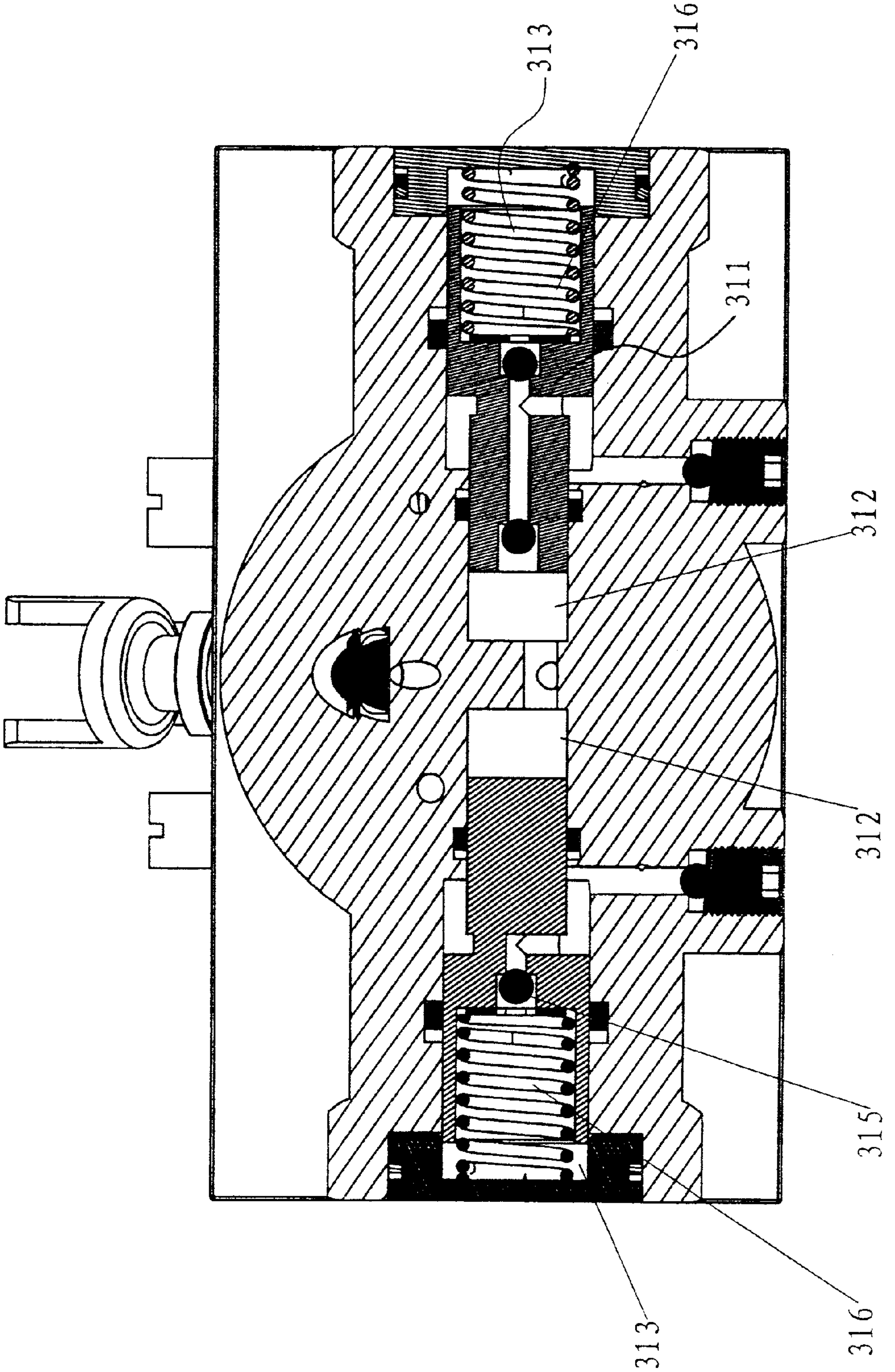
FIG. 7C is a C—C cutaway view of FIG. 7.
Figure 7D:
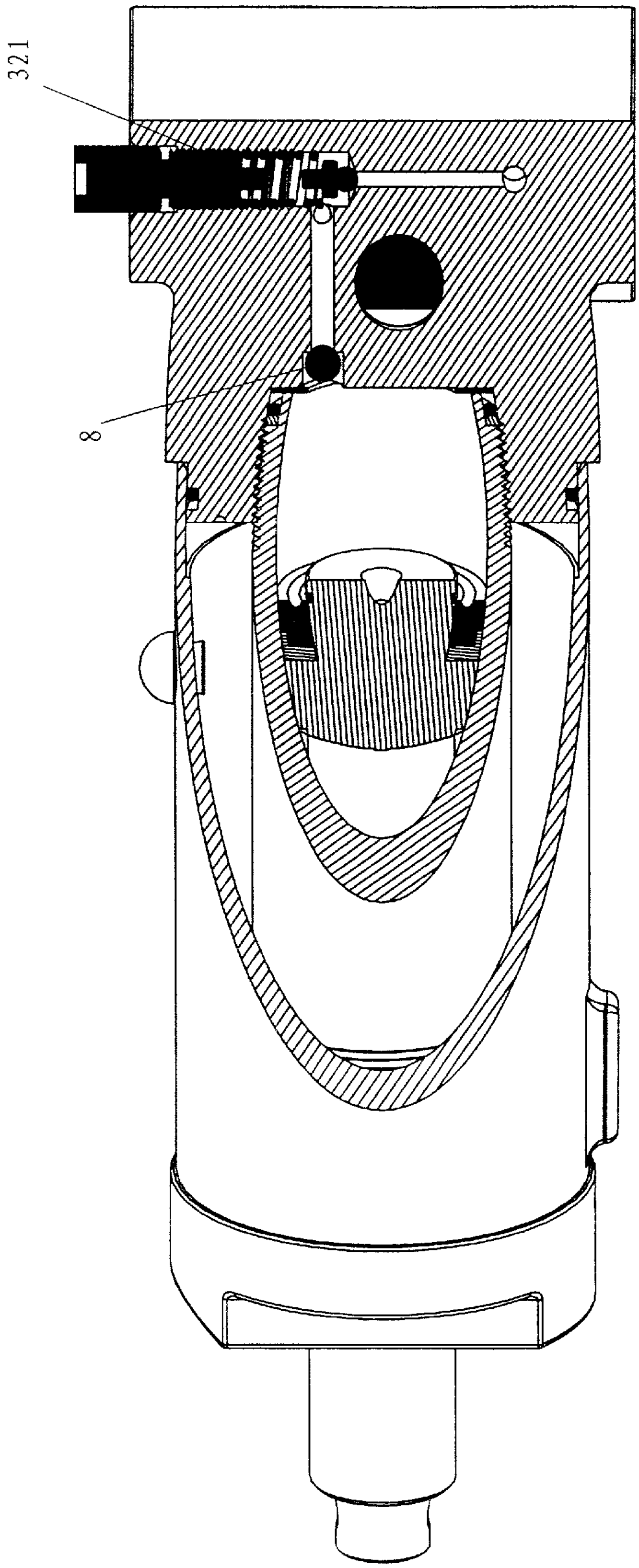
FIG. 7D is a D—D cutaway view of FIG. 7.
Figure 8:
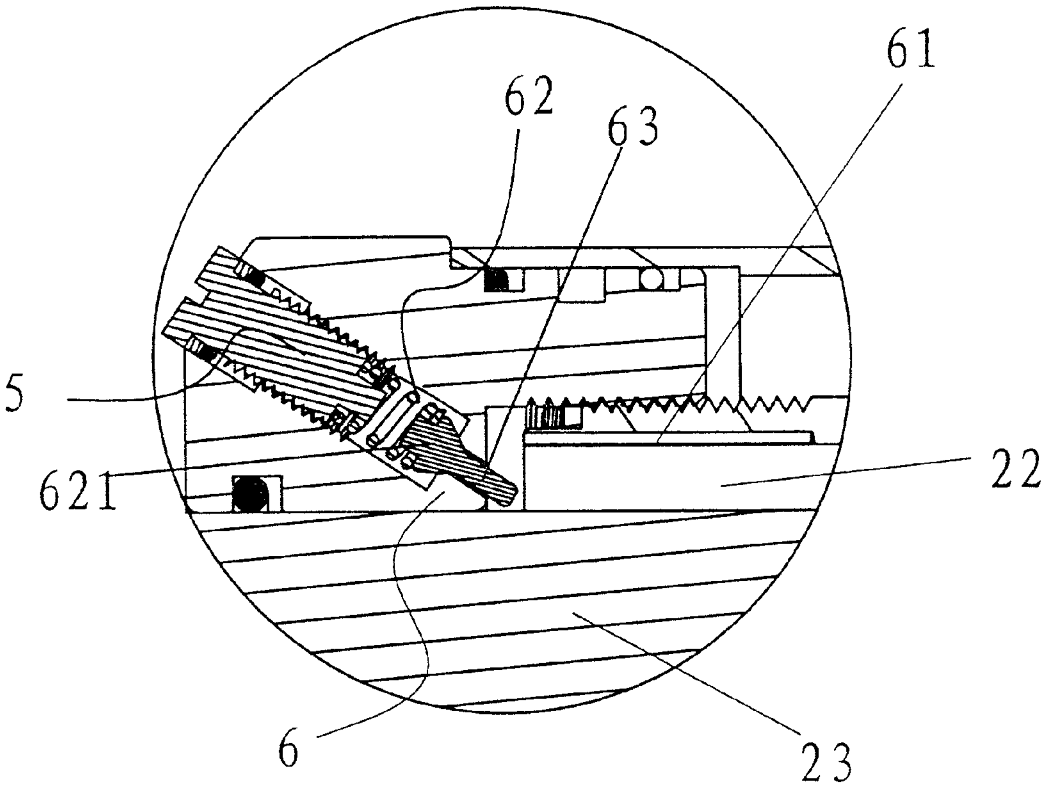
FIG. 8 is an enlarged view of portion A of FIG. 7A.

As shown in FIGS. 7A and 8, a limit unloading mechanism 6 is set at the front-end of the return cavity 22 of the output cylinder 2 in this utility model. When the piston 23 of the output cylinder 2 reaches its maximum distance, the limit unloading mechanism is activated to unload; avoiding the phenomenon that the piston strikes the end cover of the cylinder or even strikes and cracks it when the jack reaches its maximum distance.

Further as shown in FIGS. 7A and 8, a return groove 61 can be set on the mating surface between the front-end of the return cavity 22 and the piston 23 of the output cylinder 2. The return cavity 22 is unidirectionally connected to the oil tank 4 via a one-way valve 62. The core 621 of the one-way valve 62 is fixed to a pressure pin 63 extending out of the bush of the one-way valve 62. One end of the pressure pin 63 is seated in the return cavity 22 to control the opening and closure of the one-way valve 62, constituting a limit unloading mechanism 6 (see FIGS. 1–6). In the case of idle operation, when the piston reaches its maximum distance, it reaches the pressure pin 63 and opens the limit unloading mechanism 6, the hydraulic oil in the inlet cavity of the output cylinder returns into the oil tank via the return groove 61 and sequential valve 5. This can be used to meet the requirements of inspection and test standard in the case of idle operation to maximum oil return. When the piston 23 in the output cylinder 2 reaches the front-end of the return cavity 22, the inlet cavity 21 of the output cylinder 2 is connected to the return cavity 22 via the return groove 61, meanwhile, the piston 23 holds against the pressure pin 63 fixed to the valve core 621 and opens the one-way valve 62. The hydraulic oil in the inlet cavity 21 flows into the return cavity 22 via the return groove 61, and then into the return tank 4 via the one-way valve 62. In such a case, no matter how the operator applies forces to press the piston rod 13 of the input cylinder 1, the piston 23 of the output cylinder 2 remains static without any lifting operations since the pressure of the inlet cavity 21 and that of the return cavity 22 are balanced. As a result, this avoids the phenomenon that the piston 23 strikes and possibly cracks the end cover of the cylinder 2. Additionally, since the hydraulic oil of the inlet cavity 21 of the output cylinder 2 can flow back into the return tank via the return groove 61 in the first place and then via the one-way valve 62 connected to the oil tank 4, then the inlet cavity 21 does not involve the phenomenon of overload relief. As a result, the load, which has been lifted to a position, will be kept there without falling down owing to unloading.

Further as shown in FIG. 8, the one-way valve 62 with a pressure pin 63 of the limit unloading mechanism 6 can share the same valve core 621 with the control valve 5 to form a composite control valve. This further simplifies its structure and makes the inventive jack smaller in size.

Second Embodiment Configurations

The basic structure and speed regulation principles in this embodiment are the same as those in the first embodiment, and thus not mentioned again.

Figure 4:
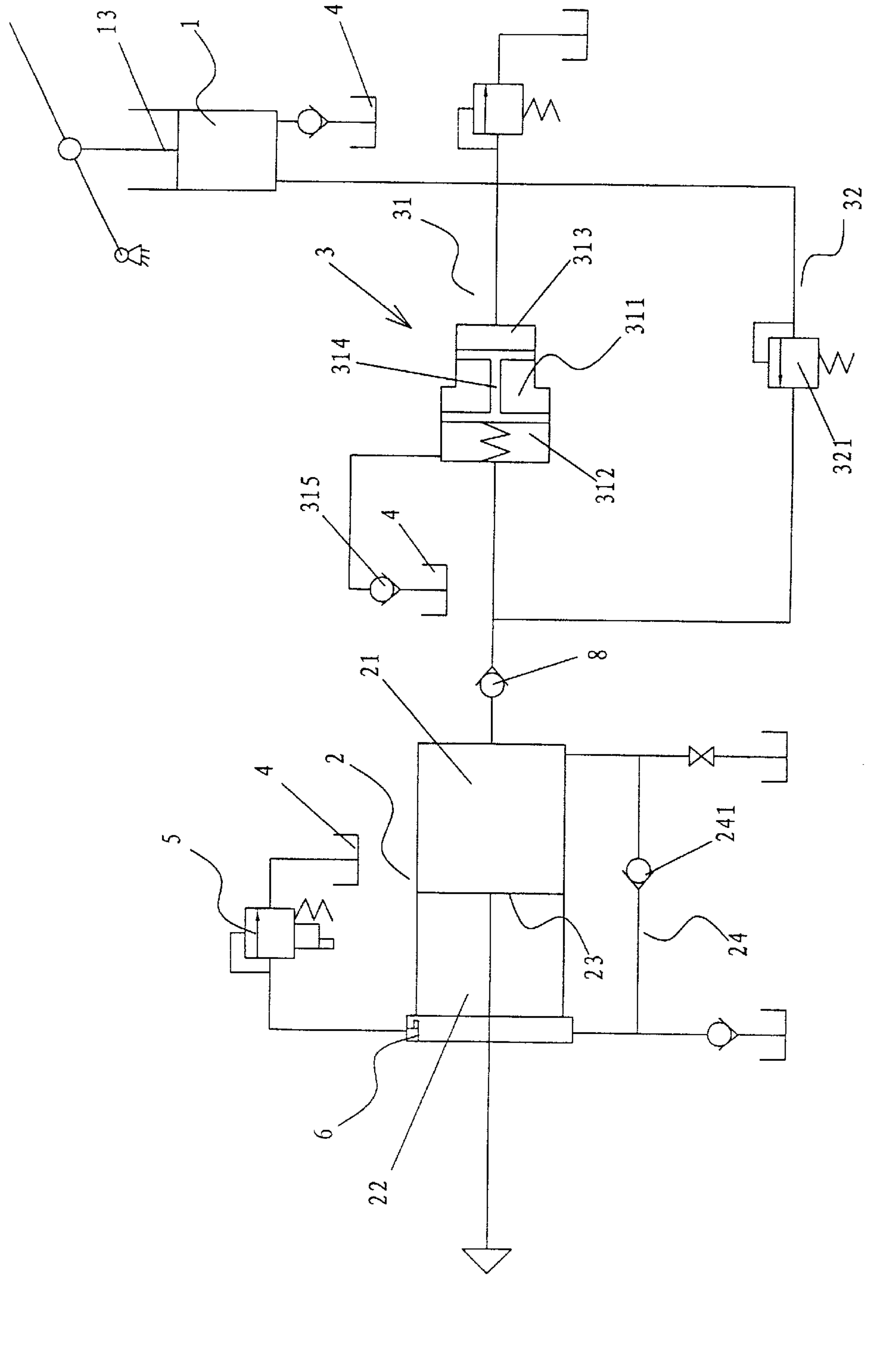
FIG. 4 is a hydraulic line diagram of a second embodiment of the speed regulation jack of the present invention.

As shown in FIG. 4, the differences between this embodiment and the first embodiment are that in this embodiment, the hydraulic speed regulation line connected in series between the input cylinder 1 and output cylinder 2 is made up of at least two parallel hydraulic sub-lines, and the hydraulic speed regulation line takes the load pressure of the output cylinder 2 as its control signal to control the opening and closure of the hydraulic sub-lines or their combination at different speed levels.

Figure 6:
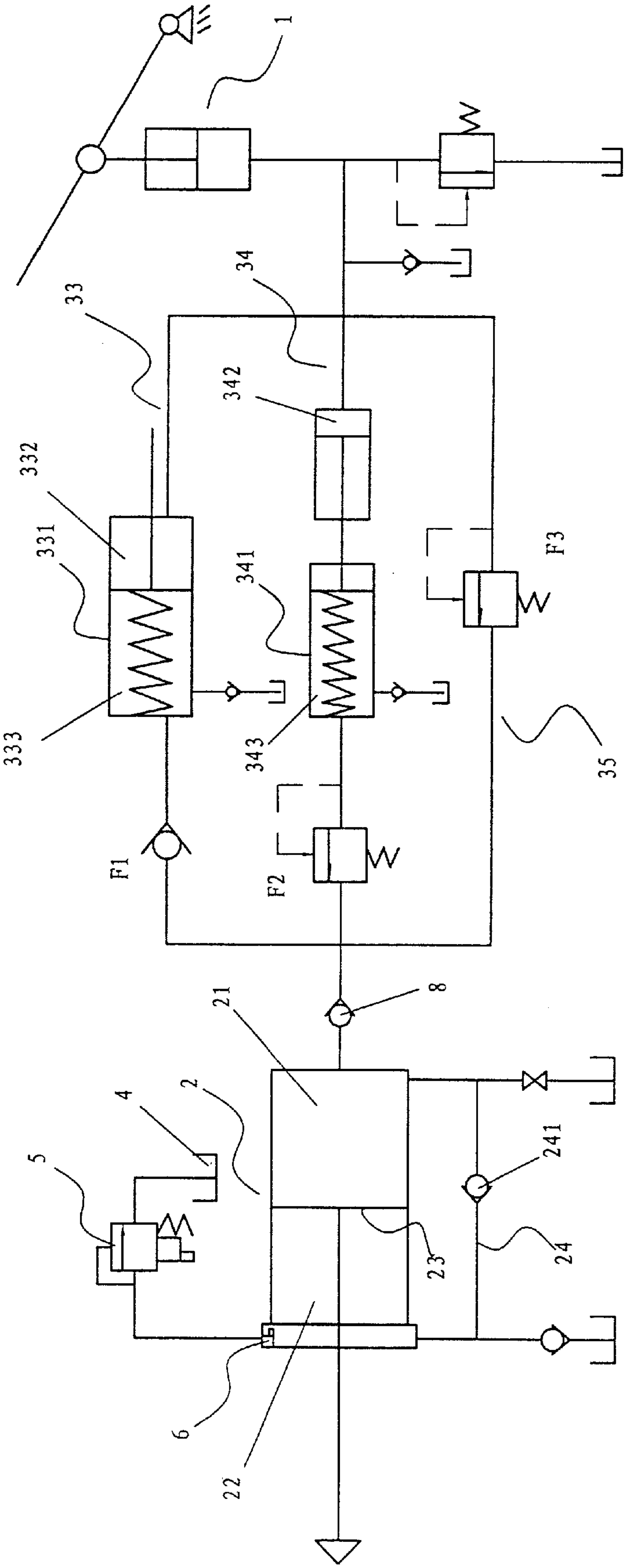
FIG. 6 is a structural schematic diagram of the present invention.

In terms of its design, different specifications of the jack can be worked out according the magnitude of the load so that in application, different jacks of different specifications can be selected depending on the specific requirements. When it is used to lift a relatively smaller load, a jack with relatively fewer speed levels can be selected. On the other hand, when it is used to lift a relatively larger load, a jack with relatively more speed levels can be selected. As shown in FIG. 6, the hydraulic speed regulation line in this configuration comprises three paralleled hydraulic sub-lines 33, 34 and 35 and has five speed levels.

A control valve is set in the hydraulic sub-lines in this utility model, and the control valve takes the load pressure as its control signal to control its opening and closure. The opening pressure of the control valve can be set in sequence, and opens and closes with the increase of the load in sequence. Additionally, speed regulation cylinders can be set in the hydraulic sub-lines and the differences between the piston areas of the input and output cavities in the hydraulic sub-lines are set in sequence.

As shown in FIG. 4, specific to this configuration, the hydraulic speed regulation line 3 comprises two parallel speed regulation sub-lines 31 and 32. A speed regulation cylinder 311 is set in the hydraulic sub-line 31 for the high speed level, and the piston thrust area of the input cavity 313 of the speed regulation cylinder is less than that of the of the output cavity 312 in order to enhance the lifting speed of piston 23 of the output cylinder 2. A flexible restoring mechanism 317 is set in the speed regulation cylinder and the output cavity 312 of the speed regulation cylinder 311 is connected the oil tank 4 via the one-way valve 315. The hydraulic sub-line 32 at the lowest speed level of the hydraulic speed regulation line 3 is connected the input cylinder 1 and output cylinder 2 via the control valve 321.

In the case of an idle load, when the piston 13 of the input cylinder 1 is pressed, the hydraulic oil is pumped into the input cavity 313 of the speed regulation cylinder 311 in the hydraulic sub-line at the high speed level and pushes its piston 314 to press the hydraulic oil in the output cavity 312. As a result, the control valve opens and delivers the hydraulic oil to the output cylinder 2, which pushes the piston 23 of the output cylinder 2 to move forward. Since in such a case, the pressure in the return cavity 22 of the output cylinder 2 is not high enough to open the control valve 5, which is connected to the oil tank 4, the control valve 5 remains closed. The hydraulic oil in the return cavity 22 of the output cylinder 2 flows into the inlet cavity 21 of the output cylinder 2 via the one-way valve 241, forming a differential oil circuit 24 to further enhance the lifting speed. In such a case, the piston rod of the output cylinder 2 lifts load at the first speed V1. When the piston 13 of this input cylinder 1 is raised, the piston in the speed regulation cylinder 311 returns to its original position under the forces from the flexible restoring mechanism 317, and meanwhile, the output cavity 312 connected to the oil tank 4 sucks oil and fills up the output cavity 312. When the piston of the input cylinder 1 is pressed once again, the above process repeats. In this process, since the sectional area of the piston in the input cavity 313 of the speed regulation cylinder 311 is smaller than that of the piston in the output cylinder 312, the lift distance to lift the load each time is increased via the differential oil circuit 24 of the output cylinder 2, the lifting speed is enhanced. The first lifting speed V1 is the fastest one.

With the gradual increase of load of the hydraulic jack, and when the pressure of the output cylinder 2 is gradually increased, the pressure of the input cylinder 1 is still not high enough to open the sequential valve 321 in the low-speed hydraulic speed regulation sub-line 32. However, the pressure of the return cavity 22 of the output cylinder 2 becomes higher, enough to open the control valve 5 connected to the oil tank 4. The hydraulic oil in the return cavity 22 directly flows back into the return tank via this control valve 5. In such a case, the pressure of the inlet cavity 21 of the output cylinder 2 is higher than that of the return cavity 22 and the one-way valve in the differential oil circuit 24 is closed. With the differential oil circuit 24 blocked, the piston rod of the output cylinder 2 lifts load at the speed V2. Since in this case, there is no further speed regulation via the differential oil circuit 24, the speed V2 is less than the speed V1 (V2<V1). However, the capacity to lift load in this case is enhanced, being capable enough to lift the load.

With the further increase of load of the hydraulic jack, the pressure of the output cylinder 2 also increases further; the jack enters a state for a heavy load. In such a heavy load state, the pressure of the hydraulic oil produced from the output cylinder 2 is higher than the set pressure of the sequential valve 321 in the low-speed hydraulic sub-line 32, and thus the sequential valve 321 opens. Part of the hydraulic oil in the input cylinder 1 flows into the inlet cavity 21 of the output cylinder 2 via this sequential valve 321, and as a result, the piston rod 23 of the output cylinder 2 moves at the speed V3 to lift load. Since there is no speed regulation cylinder set in the low-speed regulation sub-line 32, the speed V3 is less than the speed V2 (V3<V2). However, in accordance with the Law of Conservation of Energy, the capacity to lift a load increases for the same pressure, being thus capable enough to lift the load.

In the above operating process, the transfer between various lifting speeds is automatically done with the change of the load, and does not require any additional operations. The jack not only enhances the lifting efficiency, but also features simple and easy operation, achieving the purpose of both time and effort savings. Besides, in the speed regulation process, except that the input cylinder 1 absorbs oil as does a conventional jack when the low-speed hydraulic sub-line 32 between the input cylinder 1 and output cylinder 2 of hydraulic sub-line opens at last, there is no oil added into the input cylinder 1 at all the other speed levels. It only takes the hydraulic oil as a medium of pressure transfer to transfer the pressure applied against the piston of the input cylinder 1. As a result, it does not involve the problem of inadequate absorption of oil in the input cylinder as exists with the conventional technology. Furthermore, the absorption process of oil after the input cylinder 1 directly pumps hydraulic oil into the output cylinder 2 via the low-speed hydraulic sub-line 32 does not involve the problem of inadequate absorption of oil. All of the above works to avoid the phenomenon of falling back during lifting and thus ensures the work efficiency of lifting load.

Figure 5:
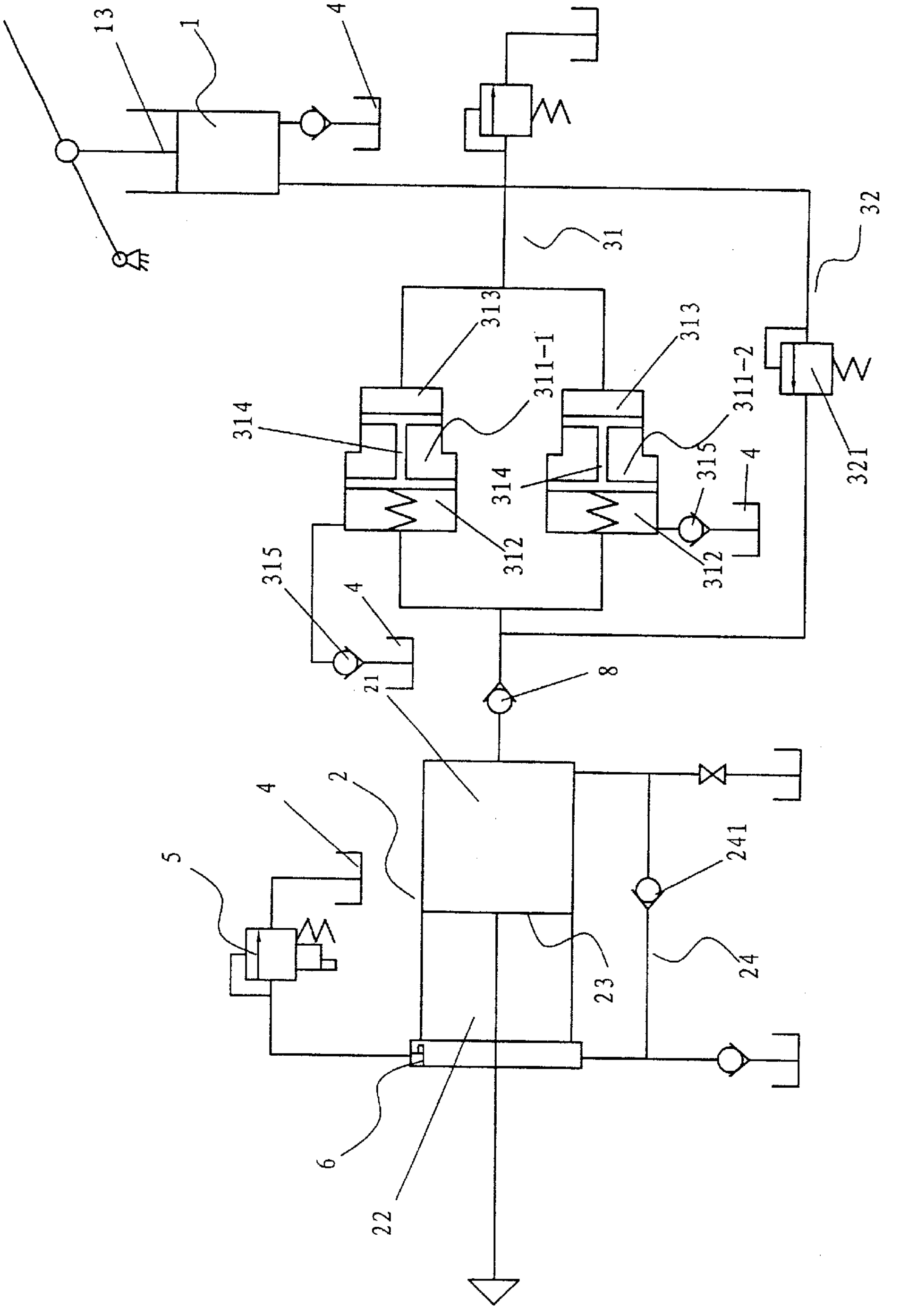
FIG. 5 is a hydraulic line diagram of another configuration of the second embodiment of the inventive speed regulation jack.

Further as shown in FIG. 5, in this configuration, two speed regulation cylinders 311-1, 311-2 can be set in parallel in the speed regulation sub-line 31. These two speed regulation cylinders 311 can be the same cylinders, which jointly accomplish the speed regulation function of the hydraulic sub-line 31.

The speed regulation cylinders 311 in this implementation example can be made up of either a single-level cylinder or two-level cylinders as shown in FIG. 5, whose structure can be the same as that described in this implementation example which will not be mentioned again here.

A limit unloading mechanism 6 can be set at the front-end of the return cavity 22 of the output cylinder 2 in this implementation example as shown in FIGS. 7A and 8. When the piston 23 of the output cylinder 2 reaches its maximum distance, the limit unloading mechanism starts to unload, avoiding the phenomenon that the piston strikes and possibly cracks the end cover of the cylinder when the jack reaches its highest distance or position. The basic structure and operation principle can be the same as those discussed previously.

Figure 7E:
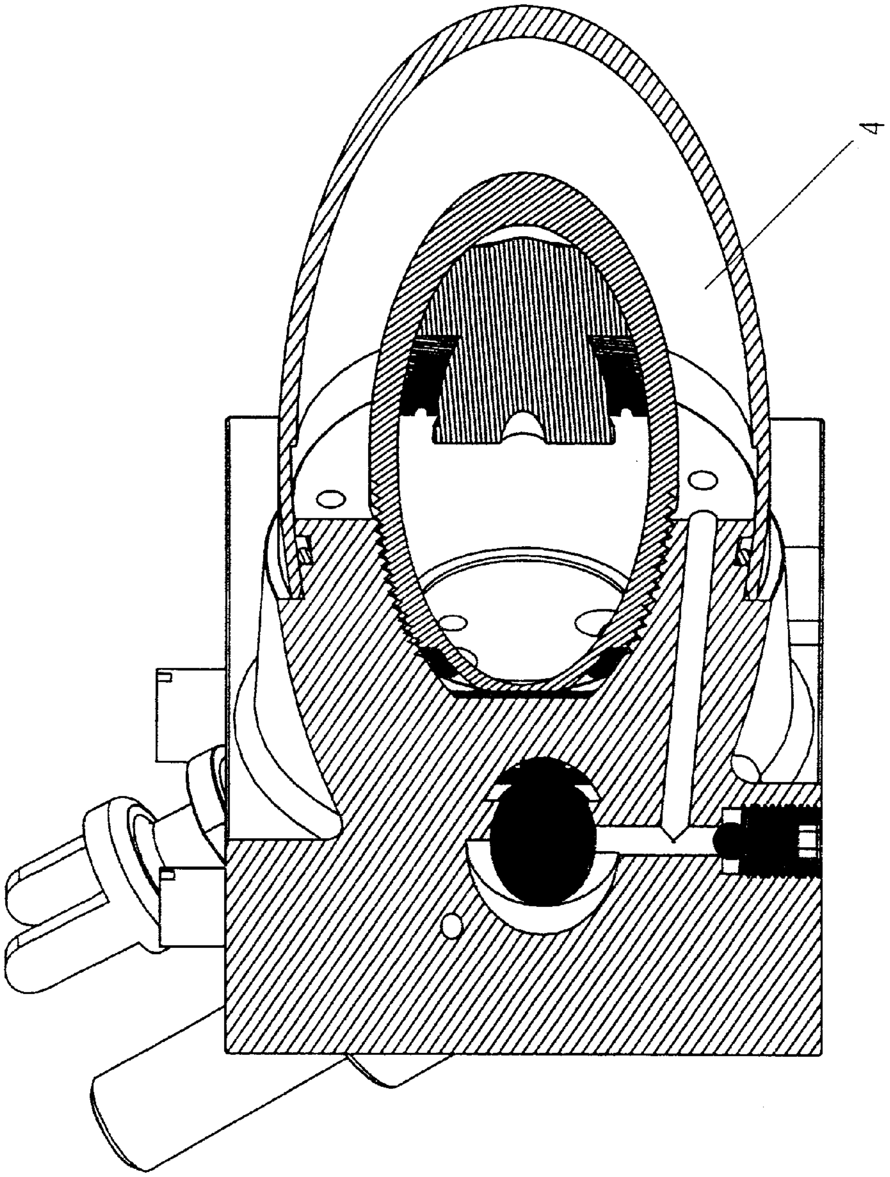
FIG. 7E is a E—E cutaway view of FIG. 7.

As shown in FIGS. 7 to 7E, the input cylinder 1, output cylinder 2 and hydraulic speed regulation line 3 can be set in one valve bush combination 7, and the output cylinder 2 can be jacketed in the oil tank 4. Additionally, a design of several oil circuit combinations can be considered. Such a design simplifies the manufacture process, reduces the production cost of the device and features this invention with advantages of compact structure and small size.

Third Embodiment Configurations

The basic structure in this embodiment is the same as that in the first and second embodiments, and thus is not mentioned once again here.

As shown in FIG. 6, the differences between this embodiment and the first and second embodiments are that the hydraulic speed regulation line 3 in this embodiment comprises three parallel hydraulic sub-lines 33, 34 and 35. Control valves F1, F2 and F3 are set respectively in each of these hydraulic sub-lines 33, 34 and 35. The sequence of the opening pressure of these control valves is set in sequence as F1<F2<F3, and the opening and closure of these control valves F1, F2 and F3 are controlled by the load magnitude sequence so that the working sequence of the hydraulic sub-lines 33, 34 and 35 are controlled accordingly.

As shown in FIG. 6, speed regulation cylinders 331 and 341 are set in the hydraulic sub-lines 33 and 34, and the area difference between the pistons of the input cavity 332 and output cavity 333 of the speed regulation cylinder 331 is larger than that between the pistons of the input cavity 342 and output cavity 343 of the speed regulation cylinder 341. The hydraulic sub-lines feature this jack with different speed levels by changing the area difference between pistons of the input cavity and output cavity of the speed regulation cylinder 341 and 342 in the hydraulic sub-lines 33 and 34. By setting the areas between pistons of the input cavities in the speed regulation cylinders 331 and 334 equal to each other, and meanwhile, the area of the piston of this output cavity 332 larger than that of the output cavity 334, a change to the area difference between pistons of the input and output cavities of the hydraulic sub-lines 33 and 34 are accomplished, which makes the working speed of the hydraulic sub-line 33 faster than that of the hydraulic sub-line 34. The hydraulic sub-line 35 at the lowest speed level in the hydraulic speed regulation line can be directly connected to the input cylinder 1 and output cylinder 2 via the control valve F3, and since its speed is not regulated by the speed regulation cylinder, this hydraulic sub-line 35 has the lowest working speed, being equivalent to the working status of a conventional jack. However, it has the largest lifting capacity, and thus enjoys the status of highest lifting capacity of this type of jack.

Its complete speed regulation process is as follows:

In the case of an idle load, when the piston of the input cylinder 1 is pressed, the control valve F1 with the lowest opening pressure and at the high speed level in the hydraulic sub-line 33 opens. The hydraulic oil is pumped to the input cavity 332 of the speed regulation cylinder 331 to force the hydraulic oil in the output cavity 333 to flow into the output cylinder 2 and pushes the piston rod 23 of the output cylinder 2 forward. Since in such a case, the load pressure of the output cylinder 2 is not high enough to open the sequential valve 5, the sequential valve 5 remains closed. The hydraulic oil in the return cavity 22 of the output cylinder 2 flows into the inlet cavity 21 of the output cylinder 2 via the one-way valve 241, forming a differential oil circuit. In such a case, the piston rod 23 lifts load at the speed V1. Upon completion of a lift, after the piston of the input cylinder 1 is raised, the piston in the speed regulation cylinder 331 returns to its original position under the force from the flexible restoring mechanism (spring), and the hydraulic oil goes up and opens the one-way valve and adds into the output cavity 333 of the speed regulation cylinder 331, and then, once the piston of the input cylinder 1 is presses again, the above process repeats.

In this process, since the piston area of the output cavity 333 in the speed regulation cylinder 331 is larger and differential oil circuit 24 is formed by the one-way valve 241 in the output cylinder 2, the one-time distance of lift by the piston in the output cylinder 2 is the largest each time, and therefore, it has the highest lifting speed. During its idle stage before load is applied, it reaches the load after only a few pump cycles. This reduces the required number of pump cycles in the case of an idle load, and therefore, enhances its work efficiency.

As the load increases, the load pressure of the output cylinder is high enough to open the sequence valve 5. As a result, the sequence valve opens, the hydraulic oil flows back into the oil tank 4 via the sequence valve 5. In such a case, the pressure in the input cavity 21 of the output cylinder 2 is higher than that in the output cavity 22, the one-way valve closes and the differential oil circuit is blocked, thus the piston rod 23 lifts load at the speed V2.

In this process, although the piston area of the input cavity 21 of the speed regulation cylinder 2 is less than that of the output cavity, since the one-way valve closes and the no differential oil circuit is formed in the output cylinder 2, the piston rod 23 still moves at the speed V2, which is slower than the speed V1. Nevertheless, the lifting capacity of the piston 23 in such a case is enhanced.

As the load increases, the control valve F2 of the hydraulic sub-line 34 at the next level opens. Part of the hydraulic oil pumped by the input cylinder 1 is delivered to the input cavity 342 of the speed regulation cylinder 341 at the next level and pushes its piston to force the hydraulic oil in the output cavity 343 to be delivered into the output cylinder 2. In such a case, since the sequence valve 5 remains open, the one-way valve 241 closes and the differential oil circuit is blocked. The piston rod 23 moves at the speed V3. The hydraulic sub-line 33 and the 34 form a hydraulic sub-line combination, which works jointly. Thus the piston rod 23 of the output cylinder lifts load at the third speed V3.

In such a case, since the area difference between pistons of the input cavity 342 and the output cavity 343 of the speed regulation cylinder 341 at the next level is less than that of the high-speed speed regulation cylinder 331, the lift speed V3 is less than V2. However, in accordance with the Law of Conservation of Energy, its lifting capacity is enhanced under the same input pressure, being capable enough to lift the load at this stage.

As the load increases further, the back pressure thus produced forces the control valve F1 of the high-speed hydraulic sub-line 33 to close. The hydraulic oil pumped by the input cylinder 1 is fully delivered to the input cavity 342 of the speed regulation cylinder 341 at the next level, which pushes its piston to force the hydraulic oil in the output cavity 343 to be delivered into the output cylinder 2. Since in such a case, the sequence valve 5 remains open, the one-way valve 241 closes and the differential oil circuit 24 is blocked. The piston rod 23 lifts load at the speed V4.

Also, in such a case, the lifting speed V4 is less than the speed V3; however, the lifting capacity increases under the same input pressure, being capable enough to lift the load at this stage.

In case that the load increases still further, the control valve F3 of the hydraulic sub-line 35 for the low-speed level opens. Part of the hydraulic oil is pumped directly to the output cylinder 2 via the hydraulic sub-line 35 at the low-speed level. However, since in this case, the sequence valve 5 remains open, the one-way valve 241 closes and the differential oil circuit 24 is blocked. The piston rod 23 lifts load at the speed V5. The hydraulic sub-line 35 and the 34 form a hydraulic sub-line combination, which works jointly to push the piston of the output cylinder 2 to move.

In such a case, the lifting speed V5 is less than the speed V4 according to the same principle of speed regulation as above; however, the lifting capacity increases still further, being capable of lifting the load at this stage.

In case that the load exceeds a certain value, the back pressure thus produced forces the control valve F2 of the hydraulic sub-line 34 at the next level to close. The hydraulic oil pumped by the input cylinder 1 is fully delivered to the output cylinder 2 via the hydraulic sub-line 35 at the low-speed level. Since in such a case, the sequential valve 5 remains open, the one-way valve 241 closes and the differential oil circuit 24 is blocked. The piston rod 23 lifts load at the speed V6.

In such a case, the sixth speed V6 is less than the fifth speed V5. It is equivalent to the working process of a conventional jack, which enjoys the largest lifting capacity, at the lowest lifting speed.

The above speed regulation process is complete for this implementation example. However, in practice, only part of the speed regulation process is used in the case of a light load according the changes of the load. Moreover, in the case of a relative heavier load, the complete process described above is used to achieve the lifting purpose. In addition, the pumping cycles needed at each speed level have something to do with the speed of change of the load. It may need more pump cycles at the speed level at which the load changes slowly or remains unchanged at a constant value, and on the other hand, one time of pump press may be enough to lift the load at the speed level with fast load change, and then, being changed to the next speed level.

The control valves F1, F2 and F3 set in the hydraulic sub-lines 33, 34 and 35 can be either one-way valves or sequential valves. The speed regulation cylinders 331 and 341 can be made up of cylinders of two levels with the piston sectional area of the first-level cylinder less than that of the second-level cylinder, and the first-level piston is connected to the second-level piston via a piston rod. When the piston of the input cylinder 1 is pressed, the hydraulic oil flows into the first-level cylinder of the speed regulation cylinder in the correspondingly opened hydraulic sub-line to force the piston of the first-level cylinder to move, and the pressure against the piston at this level is transferred to the piston at the second level via the piston rod. Additionally, the piston at the second level pushes the hydraulic oil in the output cavity of the speed regulation cylinder to flow into the output cylinder 2, thus forcing the piston of the output cylinder 2 to lift load.

In practice, the structure of the speed regulation cylinder employed in the hydraulic sub-lines can either be the two-level cylinder structure as shown in this implementation example, or the single-level cylinder structure as shown in FIG. 4 without any definite restrictions here.

A limit unloading mechanism 6 can also be set at one end of the return cavity 22 of the output cylinder 2 in this implementation example. Its structure is the same as that in the implementation example 1, which will not be mentioned once again here.

Since the basic structure and operational principle are the same as those in the first embodiment, this embodiment bears the same beneficial effects, which will not be mentioned once again here.

All the above implementation examples are the specific implementation means for this present utility model, which intends only to illustrate this present utility model other than limiting it.

While this invention has been particularly shown and described with references to preferred embodiments thereof, it will be understood by those skilled in the art that various changes in form and details may be made therein without departing from the scope of the invention encompassed by the appended claims.

What is claimed is:

1. A speed regulation jack comprising:

at least one input cylinder and one output cylinder;

parallel hydraulic lines connected between the input and output cylinders;

a differential oil circuit that is connected between an inlet cavity and a return cavity of the output cylinder;

a control valve that is connected in series between the return cavity of the output cylinder and an oil tank to control oil returned to the return cavity; and an unloading mechanism in a front-end of the return cavity of the output cylinder.

2. The speed regulation jack of claim 1, further comprising a one-way valve in the differential oil circuit to unidirectionally connect the return cavity of the output cylinder to the inlet cavity.

3. The speed regulation jack of claim 1, further comprising a return groove in a mating surface between the front-end of the return cavity and a piston of the output cylinder, the return cavity being unidirectionally connected to the oil tank via a one-way valve, the core of the one-way valve being fixed to a pressure pin extending out of a seat of the one-way valve, one end of the pressure pin being seated in the return cavity to control the opening and closure of the one-way valve.

4. The speed regulation jack of claim 3, wherein the one-way valve of the unloading mechanism shares a valve core with the control valve.

5. The speed regulation jack of claim 1, wherein the control valve is a sequential valve.

6. The speed regulation jack of claim 1, wherein the hydraulic lines are hydraulic speed regulation lines.

7. The speed regulation jack of claim 6, wherein the input cylinder, output cylinder and at least one of the hydraulic speed regulation lines are set in one valve bush combination, and an output cylinder jacket is set in the oil tank.

8. A speed regulation jack comprising:

at least one input cylinder and one output cylinder;

parallel hydraulic lines connected between the input and output cylinders;

a differential oil circuit that is connected between an inlet cavity and a return cavity of the output cylinder;

a control valve that is connected in series between the return cavity of the output cylinder and an oil tank to control oil returned to the return cavity; and hydraulic speed regulation cylinders in the hydraulic lines, the hydraulic lines being hydraulic speed regulation lines.

9. A speed regulation jack comprising:

at least one input cylinder and one output cylinder;

parallel hydraulic lines connected between the input and output cylinders;

a differential oil circuit that is connected between an inlet cavity and a return cavity of the output cylinder;

a control valve that is connected in series between the return cavity of the output cylinder and an oil tank to control oil returned to the return cavity; wherein the hydraulic lines are hydraulic speed regulation lines that comprise at least two hydraulic sub-lines connected in parallel, the hydraulic speed regulation lines taking a load pressure of the output cylinder as a control signal to control an opening and closure of the hydraulic sub-lines.

10. The speed regulation jack of claim 9, wherein sub-line control valves are set in the hydraulic sub-lines, which take a load pressure as a control signal to control the opening and closure of the hydraulic sub-lines.

11. The speed regulation jack of claim 10, wherein an opening pressure of the sub-line control valves in the hydraulic sub-lines are set in sequence.

12. The speed regulation jack of claim 9, further comprising speed regulation cylinders in the hydraulic sub-lines.

13. The speed regulation jack of claim 12 further comprising a flexible restoring mechanism in at least one of the speed regulation cylinders, an output cavity of the speed regulation cylinder being connected to the oil tank via a one-way valve.

14. The speed regulation jack of claim 12, wherein at least one of the speed regulation cylinders comprises oil cylinders of two different levels, the sectional area of a piston of a first-level cylinder is less than that of a piston of a second-level cylinder, and the first-level piston and the second-level piston are connected via a piston rod.

15. The speed regulation jack of claim 12, wherein at least one of the speed regulation cylinders is made up of a single-level oil cylinder having a piston rod that extends out of an input cavity.

16. The speed regulation jack of claim 9, wherein the hydraulic sub-line at the lowest speed level directly connect to the input and output cylinders via a sub-line control valve.

* * * * *